(12) United States Patent
Shapiro (10) Patent No.: US 8,512,567 B2
(45) Date of Patent: Aug. 20, 2013

(54) VAPOR COMPRESSION MEMBRANE DISTILLATION SYSTEM AND METHOD

(75) Inventor: Andrew Philip Shapiro, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 394 days.

(21) Appl. No.: 12/872,502

(22) Filed: Aug. 31, 2010

(65) Prior Publication Data

US 2012/0048803 A1 Mar. 1, 2012

(51) Int. Cl.
*B01D 15/00* (2006.01)
*B01D 35/18* (2006.01)
*B01D 3/00* (2006.01)
*B01D 3/14* (2006.01)
*C02F 1/44* (2006.01)
*C02F 1/02* (2006.01)

(52) U.S. Cl.
USPC ........... 210/640; 210/175; 210/180; 210/176; 210/195.1; 203/10; 203/11; 203/12; 203/95; 203/98; 202/81; 202/182; 202/200

(58) Field of Classification Search
USPC .. 210/640, 175–176, 180, 195.1; 203/10–12, 203/95, 98; 202/81, 182, 200
See application file for complete search history.

(56) References Cited

U.S. PATENT DOCUMENTS

| | | | |
|---|---|---|---|
| 3,129,145 A * | 4/1964 | Hassler | 203/10 |
| 3,878,054 A * | 4/1975 | Rodgers | 203/11 |
| 4,440,146 A * | 4/1984 | Audino et al. | 126/532 |
| 4,545,862 A | 10/1985 | Gore et al. | |
| 4,725,359 A * | 2/1988 | Ray | 210/640 |
| 4,746,437 A | 5/1988 | Koseki et al. | |
| 5,300,197 A * | 4/1994 | Mitani et al. | 202/177 |
| 6,695,951 B1 | 2/2004 | Bitterly et al. | |
| 6,716,355 B1 | 4/2004 | Hanemaaijer et al. | |
| 6,875,247 B2 * | 4/2005 | TeGrotenhuis et al. | 55/319 |
| 6,911,121 B1 * | 6/2005 | Beckman | 203/49 |
| 7,459,084 B2 | 12/2008 | Baig et al. | |
| 7,611,604 B2 * | 11/2009 | Salmisuo et al. | 159/49 |
| 8,029,671 B2 * | 10/2011 | Cath et al. | 210/321.64 |

(Continued)

FOREIGN PATENT DOCUMENTS

WO 03000389 A2 1/2003

OTHER PUBLICATIONS

Search Report and Written Opinion from corresponding PCT Application No. PCT/US2011/044306 dated Jan. 17, 2012.

(Continued)

*Primary Examiner* — Ana Fortuna
(74) *Attorney, Agent, or Firm* — Mary Louise Stanford (57) ABSTRACT

A desalination system wherein a latent heat of condensation produced by the temperature gradient across a membrane distillation (MD) module is transferred directly to a latent heat of vaporization during desalination of a liquid flow stream. The desalination system comprises the MD module disposed within an object and configured to receive an input feed stream for desalination and produce an output flow stream of a product. The system also comprises a vapor compressor in fluidic communication with the MD module and configured to introduce a hot steam to a high temperature side of the MD module and extract a cool steam, having a temperature less than the hot steam, from a low temperature side of the MD module, thereby creating a temperature gradient across of the MD module. A desalination method is also presented.

20 Claims, 5 Drawing Sheets

(56) References Cited

U.S. PATENT DOCUMENTS

| | | | |
|---|---|---|---|
| 8,197,673 B2* | 6/2012 | Khan | 208/216 R |
| 2007/0193739 A1* | 8/2007 | Smith et al. | 166/250.01 |
| 2008/0185346 A1 | 8/2008 | Xiong et al. | |
| 2009/0000939 A1 | 1/2009 | Heinzl | |
| 2012/0048803 A1* | 3/2012 | Shapiro | 210/640 |
| 2012/0160753 A1* | 6/2012 | Vora et al. | 210/175 |

OTHER PUBLICATIONS

Jiyang Xia, et al.; "Desalination System and Method"; Pending U.S. Appl. No. 12/512,324, filed Jul. 30, 2009; 25 Pages.

* cited by examiner

$$\varepsilon = \frac{\text{ENERGY}}{\text{MASS DISTILLATE}}$$

$$= w \frac{\text{COMPRESSED STEAM}}{\text{PRODUCT WATER}}$$

$$= \frac{w}{\text{GOR}}$$

$$w = \frac{c_p T_L}{\eta_c} \left( P_r^{(\gamma-1)/\gamma} - 1 \right) \quad \text{— 304}$$

$$= \frac{c_p T_H \left( P_r^{(\gamma-1)/\gamma} - 1 \right)}{\eta_c + \left( P_r^{(\gamma-1)/\gamma} - 1 \right)}$$

$$\text{GOR} = \frac{P_H \left( 1 - 1/P_r \right)}{\Delta P_{min}} \quad \text{— 306}$$

$$\varepsilon = \frac{c_p T_H \Delta P_{min}}{P_H} \cdot \frac{P_r^{(\gamma-1)/\gamma} - 1}{\left( 1 - 1/P_r \right)\left( \eta_c + \left( P_r^{(\gamma-1)/\gamma} - 1 \right) \right)} \quad \text{— 302}$$

VAPOR COMPRESSION MEMBRANE DISTILLATION SYSTEM AND METHOD

BACKGROUND

The present disclosure relates generally to desalination systems and methods. More particularly, this disclosure relates to desalination systems and methods using membrane distillation and a novel configuration including vapor compression, membranes and heat transfer surfaces.

Less than one percent of water on the earth's surface is suitable as an eligible water source for direct consumption in domestic or industrial applications. In view of the limited eligible water sources, de-ionization or desaltification of wastewater, seawater or brackish water, commonly known as desalination, becomes an option to produce fresh water.

Different desalination processes, such as distillation, vaporization, reverse osmosis, and partial freezing are currently employed to de-ionize or desalt a water source. Of particular interest is membrane distillation as an emerging technology. Membrane distillation (MD) has the potential to compete with conventional thermal desalination processes. To date the common configurations of membrane distillation are direct contact MD, air gap MD, and vacuum MD. In order for MD to make efficient use of energy, the latent heat of condensation of the distillate must be recovered and recycled into the process. In all known implementations of these MD configurations, the recovery of the latent heat of condensation has been through absorption by a liquid water stream in the form of sensible heat. The liquid is subsequently exposed to an MD membrane to allow vaporization. Such processes can suffer from low efficiency and low recovery of distillate from the feed water due to the need for a high flow rate of liquid mass relative to the produced distillate and high-energy consumption, which may prohibit them from being widely implemented.

Therefore, there is a need for a new and improved desalination system and method for desalination using membrane distillation.

BRIEF SUMMARY

A desalination system is provided in accordance with an embodiment. The desalination system comprises a membrane distillation module and a vapor compressor in fluidic communication with the membrane distillation module. The membrane distillation module is disposed within an object and configured to receive an input feed stream for desalination and produce an output flow stream of a product. The vapor compressor is in fluidic communication with the membrane distillation module and configured to introduce a hot steam to a high temperature side of the membrane distillation module and extract a cool steam, having a temperature less than the hot steam, from a low temperature side of the membrane distillation module, thereby creating a temperature gradient across of the MD module. During operation, a latent heat of condensation produced by the temperature gradient across the MD module is transferred directly to a latent heat of vaporization during desalination of a liquid flow stream between the input feed stream and the output flow stream.

A desalination method is provided in accordance with another embodiment. The desalination method comprises supplying an unpurified liquid in an input feed stream; providing a membrane distillation module disposed within an object and configured to receive the input feed stream for desalination and produce an output flow stream of an at least partially purified liquid; supplying a vapor compressor in fluidic communication with the membrane distillation module; passing the input feed stream through the membrane distillation module as a flow stream while withdrawing a steam from a low temperature side of the membrane distillation module, compressing the withdrawn steam to produce a hot steam having a higher temperature than the withdrawn steam and introducing the hot steam to a high temperature side of the membrane distillation module, thereby creating a temperature gradient across of the MD module, and wherein a latent heat of condensation produced by the temperature gradient across the MD module is transferred directly to a latent heat of vaporization during the desalination process.

These and other advantages and features will be better understood from the following detailed description of preferred embodiments of the invention that is provided in connection with the accompanying drawings.

DETAILED DESCRIPTION

Preferred embodiments of the present disclosure will be described hereinbelow with reference to the accompanying drawings. In the following description, well-known functions or constructions are not described in detail to avoid obscuring the disclosure in unnecessary detail.

Figure 1:
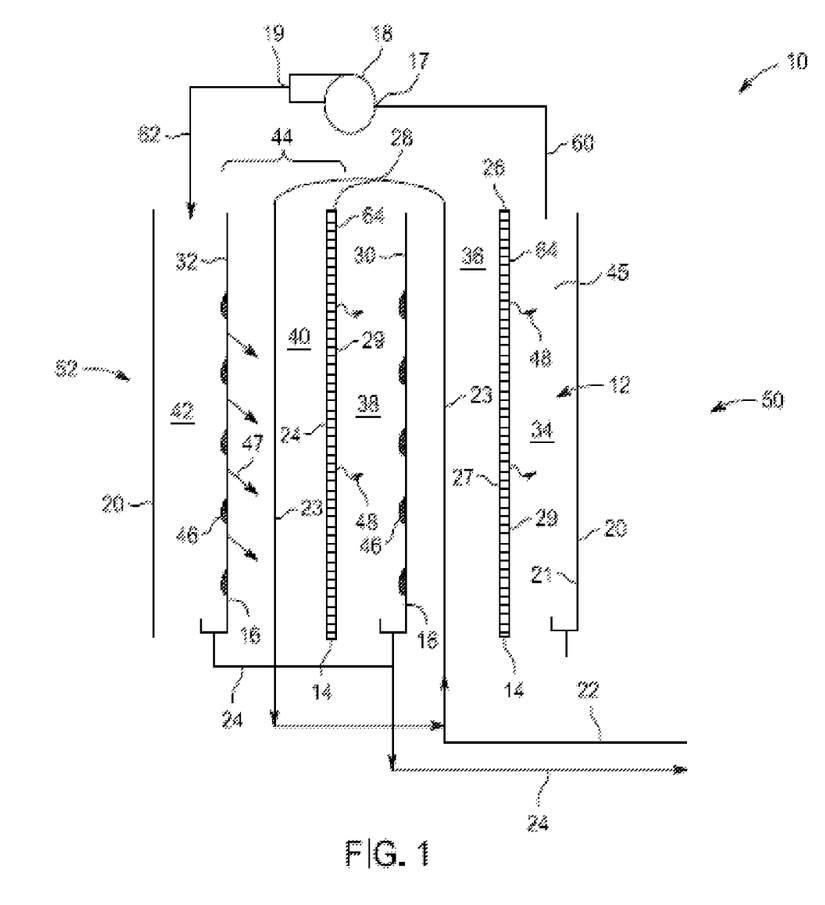
FIG. 1 is a schematic diagram of a desalination system in accordance with an exemplary embodiment.

FIG. 1 is a schematic diagram of a desalination system 10 that utilizes vapor compression multi-effect membrane distillation in accordance with an exemplary embodiment. For the illustrated example, the desalination system 10 comprises a membrane distillation (MD) module 12 including a plurality of MD membranes 14 and a plurality of heat transfer films 16 arranged in alternating or interleaved configuration. The desalination system 10 further includes a vapor compressor 18 in fluidic communication therewith.

In exemplary embodiments, the MD module 12 is disposed within an object 20, such as a plate and frame assembly, or the like, and configured to receive an input feed stream 22 of an unpurified liquid having undesirable substances, such as salts or other solutes, dissolved gasses, organic compounds, or other impurities from a liquid feed source (not shown). When used for desalination, the input feed stream 22 may be seawater or brackish water. While the liquid feed source has not been shown herein, it is anticipated that the source may be a tank, or any other suitable liquid feed source such as a feed stream from another system or an intake in communication with a feed source, such as a body of water, such as an ocean or lake. Desalination system 10, and more particularly, vapor compression multi-effect membrane distillation produces an output flow stream (a product stream) 24, which may be a dilute liquid coming out of the MD module 12, may have a lower concentration of the undesirable species as compared to the input feed stream 22. In some examples, the output flow stream 24 may be circulated into additional MD modules for further desalination.

In some embodiments, the MD module 12 may comprise a first MD membrane 26 and a second MD membrane 28 interleaved with a first heat transfer film 30 and a second heat transfer film 32. MD membranes 26 and 28 may be formed of porous hydrophobic polymer films, such as porous hydrophobic polypropylene or polytetrafluoroethylene membranes, having a water vapor permeation flux of at least 0.01 kg/m$^2$h mbar. MD membranes 26, 28 each have a feed surface 27 and a permeate surface 29. The MD membranes 26, 28 may have pores of any suitable size, however pore sizes of about 0.01 to about 0.5 microns are suitable, and in the preferred embodiment pore sizes of about 0.1 to about 0.45 microns. The MD membranes 26, 28 may include a single membrane layer, or multiple layers including support and active layers and of any suitable shape, including flat or other configurations that may provide for a more robust MD membrane. In a preferred embodiment, the MD membranes 26, 28 are formed having a single active layer. Any conventional porous hydrophobic membrane may be used herein, however one example is the Aspire™ microfiltration membranes that may be available commercially from General Electric, Kansas City, Mo.

The first heat transfer film 30 and the second heat transfer film 32 may be formed of metal foil or polymer film. Metal foils made from stainless steel, titanium, nickel, aluminum, copper and related alloys are appropriate depending on compatibility with the input feed stream 22. The metal foils may have a thickness of any suitable size, however a thickness of about 0.001 to 0.01 inches are suitable, and in a preferred embodiment a thickness of about 0.002 to 0.004 inches is preferred. Polymer films composed of polypropylene, polytetrafluoroethylene, nylon, polyethylene, polyvinylchloride, polyvinylidene difluoride are suitable. The polymer films may have a thickness of any suitable size, however a thickness of about 0.001 to 0.005 inch are suitable, and in a preferred embodiment a thickness of about 0.002 to 0.004 inches is preferred. Polymer film with heat transfer enhancing additives such as carbon and metal are also suitable.

The MD module 12 is disposed within the tank 20 in a manner that provides for the inflow and outflow of a flow stream 23 via input feed stream 22 and output flow stream 24. The MD membranes 26, 28 and films 30, 32 are positioned a distance one from another so define a plurality of channels within the MD module 12. More specifically, the MD module 12 is configured to include a plurality of liquid flow channels and vapor flow channels therein. In an embodiment, a first extreme vapor flow channel 34 is formed between and bounded by a sidewall 21 of the tank 20 and the first MD membrane 26. A first liquid flow channel 36 is formed between and bounded by the first MD membrane 26 and the first heat transfer film 30. An intermediary vapor flow channel 38 is formed between and bounded by the first heat transfer film 30 and the second MD membrane 28. A second liquid flow channel 40 is formed between and bounded by the second MD membrane 28 and the second heat transfer film 32. A second extreme vapor flow channel 42 is formed between and bounded by the second heat transfer film 32 and the sidewall 21 of the tank 20. The interleaved membranes 26, 28 and films 30, 32 form the MD module 12.

An inlet 17 of the vapor compressor 18 is coupled to the first extreme vapor channel 34 and an outlet 19 of the vapor compressor 18 is coupled to the second extreme vapor channel 42. The coupling of the vapor compressor 18 and the channels 34 and 42 provides for the introduction of hot steam to one side of the MD module 12 and cooler steam to be withdrawn from the other side of the MD module 12. During the desalination process, a liquid, such as the input feed stream 22 is passed through the MD module 12 as indicated by flow stream 23, and the desalinated product exits the MD module 12 as the output (product) flow stream 24. More specifically, a liquid to be desalinated is introduced via the input feed stream 22 to the first liquid flow channel 36 formed between the MD membrane 26 and the heat transfer film 30. The MD module 12 can be constructed so that the flow stream 23 is countercurrent to the direction of vapor and heat transport within the channels 34, 36, 38, 40, 42 as illustrated in FIG. 1. Alternatively, the flow stream 23 can flow in parallel through the several liquid flow channels in each repeat MD module 12 as described below with regard to FIG. 2. Alternatively, the flow stream 23 can flow co-current to the direction of vapor flow through the several liquid flow channels in each repeat MD module 12.

In the embodiment illustrated in FIG. 1, two repeat MD pairings 44, each comprised of a single MD membrane 14 and a heat transfer film 16 form the MD module 12 and achieve desalination. It should be understood that it is anticipated that any number of MD pairings 44 may be used to form the MD module 12, and that the embodiment of FIG. 1 is illustrative only and not intended to be limiting. Within each repeat MD pairing 44 the flow stream 23 is cooler than a steam vapor 45 that is present on a side of the heat transfer film 16 bounding the flow stream 23. This temperature difference results in condensation 46 of the steam vapor 45 on a surface 15 of the heat transfer film 16 and transfer of the associated latent heat 47 through the heat transfer film 16 to the flow stream 23. In addition, because the flow stream 23 is in contact with an MD membrane 14, vaporization of the flow stream 23 occurs (producing a water vapor 48) consuming a portion of the latent heat 47 absorbed from the condensation 46, and providing slightly lower temperature and pressure steam to the vapor flow channels 34, 38, 42.

During desalination, the vapor compressor 18 compresses steam 60 from a low temperature side 50 of the MD module 12. Compression of the steam 60 in turn causes a rise in temperature and forms a hot steam 62 having a temperature greater than a temperature of the steam 60. The hot steam 62 is introduced to a high temperature side 52 of the MD module 12. In this way, there is a temperature gradient across of the MD module 12. This temperature gradient causes progressively lower vapor pressures in the vapor flow channels 34, 38, 42 from the hot side 50 to the cold side 52 of the MD module 12. The lower vapor pressures on a cold side 64 of each of the MD membranes 26, 28 drives the water vapor 48 flux through the MD membranes 26, 28. In each repeat pairing 44 the water vapor 48 that passes through the MD membranes 26, 28 is condensed forming condensation 46 and collected as product water via output flow stream 24. Depending on the vapor compression ratio and the number of repeat pairings 44 in the MD module 12, different temperature and vapor pressure drops across the MD module 12 can be maintained. In general, the more repeat pairings 44 and higher the fraction of latent heat of condensation that is transferred directly to evaporation, the higher the thermal efficiency will be. For one mass unit of vapor compressed it is reasonable to expect 3-10 units of product in the form of pure water to be produced.

In conventional membrane distillation configurations, the latent heat of condensed water is transferred to the sensible heat of a feed stream to achieve high thermal efficiency. This conventional process is limited in that the ratio of latent heat of water to the specific heat of water forces the mass flow of the condensed stream to be much less than the mass flow of the liquid stream that absorbs the latent heat. In the disclosed embodiments, the latent heat of condensation is transferred directly to the latent heat of vaporization. In this way the mass flows of the output stream (condensing) and the input feed stream can be of the same order of magnitude. This simplifies the system design and enables the construction of high efficiency MD modules.

Figure 2:
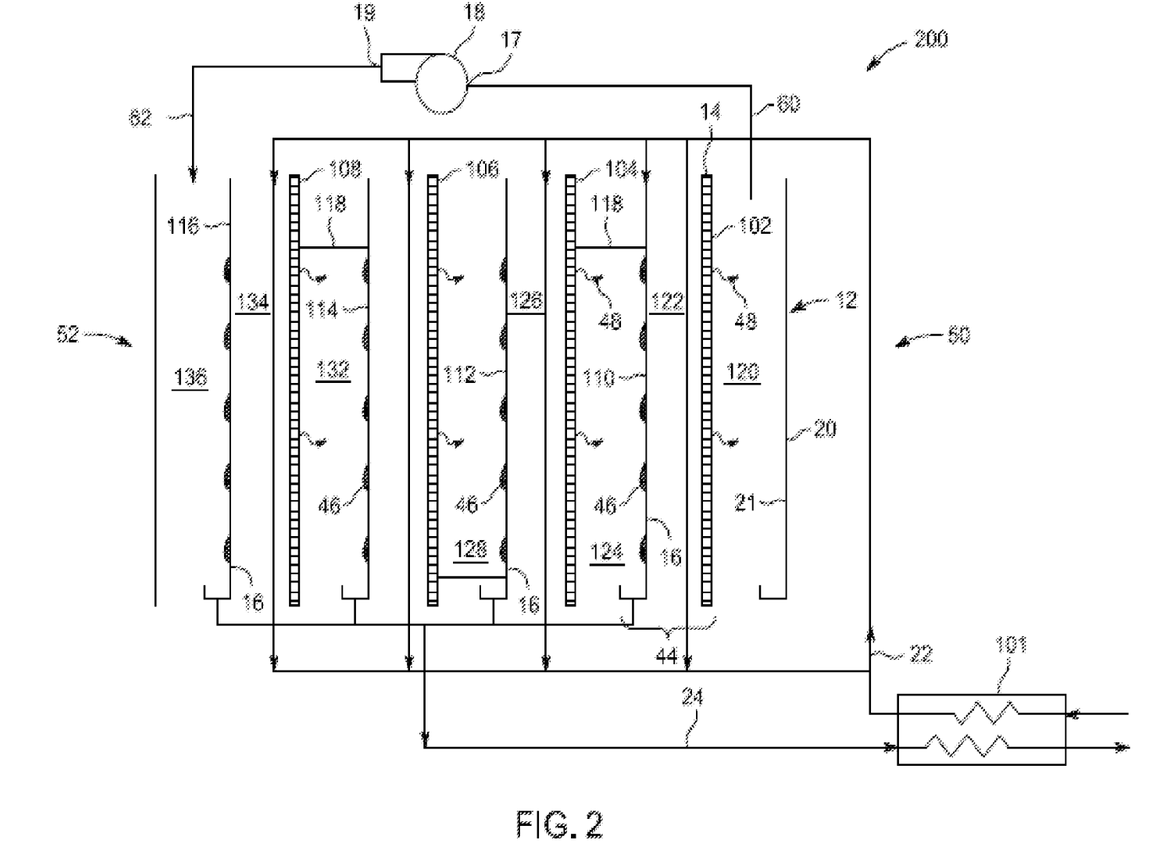
FIG. 2 is a schematic diagram of the desalination system including a heat exchanger in accordance with an exemplary embodiment.

FIG. 2 is a schematic diagram of a desalination system 100 including a MD module 12 and heat exchanger according to another embodiment that utilizes vapor compression multi-effect membrane distillation. The same numerals in FIGS. 1-3 may be used to indicate the similar elements.

In the embodiment, illustrated is a desalination system 100 comprising a membrane distillation (MD) module 12 including a plurality of MD membranes 14 and heat transfer films 16 arranged in alternating or interleaved configuration and of materials similar to the embodiment illustrated in FIG. 1. In this particular embodiment, the desalination system 100 further includes a vapor compressor 18 and a heat exchanger 101.

The MD module 12 is disposed within a tank 20, or the like, and configured to receive an input feed stream 22 having undesirable substances, such as salts or other impurities from a liquid source for desalination. Vapor compression multi-effect membrane distillation is used to generate an output stream (a product stream) 24 coming out of the MD module that may be a dilute liquid having a lower concentration of salts or other impurities as compared to the input feed stream 22.

In the illustrated embodiment, the MD module 12 may comprise a first MD membrane 102, a second MD membrane 104, a third MD membrane 106 and a fourth MD membrane 108, interleaved with a first heat transfer film 110, a second heat transfer film 112, a third heat transfer film 114 and a fourth heat transfer film 116. The MD module 12 is disposed within the tank 20 in a manner that provides for the inflow and outflow of fluids. A plurality of spacers 118 may be included to position membranes 102, 104, 106, 108 and films 110, 112, 114, 116 a distance one from another to define a plurality of channels within the MD module 12 and to space membrane 102 and film 116 a distance from object 20. The spacers 118 may comprise any permeable material, including membranes and porous materials to separate the membranes 102, 104, 106, 108 and films 110, 112, 114, 116. In non-limiting examples, the spacer may have or itself may be space to form flow channels through which liquid and vapor for processing passes. Typical forms of spacers are woven and nonwoven meshes.

The MD module 12 is configured to include a plurality of liquid flow channels and vapor flow channels therein. In an embodiment, a first extreme vapor flow channel 120 is formed between a sidewall 21 of the tank 20 and the first MD membrane 102. A first liquid flow channel 122 is formed between the first MD membrane 102 and the first heat transfer film 110. A first intermediary vapor flow channel 124 is formed between the first heat transfer film 110 and the second MD membrane 104. A second liquid flow channel 126 is formed between the second MD membrane 104 and the second heat transfer film 112. A second intermediary vapor flow channel 128 is formed between the second heat transfer film 112 and the third MD membrane 106. A third liquid flow channel 130 is formed between the third MD membrane 106 and the third heat transfer film 114. A third intermediary vapor flow channel 132 is formed between the third heat transfer film 114 and the fourth MD membrane 108. A fourth liquid flow channel 134 is formed between the fourth MD membrane 108 and the fourth heat transfer film 116. A second extreme vapor flow channel 136 is formed between the fourth heat transfer film 116 and the sidewall 21 of the tank 20. The interleaved MD membranes 102, 104, 106, 108 and films 110, 112, 114, 116 form the MD module 12.

An inlet 17 of the vapor compressor 18 is coupled to the first extreme vapor channel 120 and an outlet 19 of the vapor compressor 18 is coupled to the second extreme vapor channel 136. The coupling of the vapor compressor and the channels 120 and 136 provides for the introduction of hot steam to one side of the MD module 12 and cooler steam to be withdrawn from the other side of the MD module 12. During the desalination process, a liquid, such as the input feed stream 22 enters the MD module 12 and is passed through the MD module 12 as a flow stream 23, and the desalinated product exits the MD module as the output (product) flow stream 24. More specifically, liquid water to be desalinated is introduced via the input feed stream 22 as the flow stream 23 to the liquid flow channels 122, 126, 130, 134 formed between the MD membranes 102, 104, 106, 108 and the heat transfer films 110, 112, 114, 116. In the illustrated embodiment, the MD module 12 is constructed so that the flow stream 23 is parallel through the several liquid flow channels 122, 126, 130, 134 in each repeat MD module 12.

In the embodiment illustrated in FIG. 2, four repeat MD pairings 44, each comprised of a single MD membrane 14 and a heat transfer film 16 form the MD module 12 and achieve desalination. It should be understood that it is anticipated that any number of MD pairings may be used to form the MD module 12, and that the embodiment of FIG. 2 is illustrative only and not intended to be limiting. Similar to the previously described embodiment, in each repeat MD pairing 44, the input feed stream 23 is cooler than steam 45 that is present on the opposite side of the heat transfer films 16. As a result of this temperature difference, condensation 46 forms on a surface of each of the heat transfer films 16 and the associated latent heat 47 is transferred to the flow stream 23. In addition, vaporization 48 of the flow stream 23 occurs consuming a portion of the latent heat 47 absorbed from the condensation 46, and providing slightly lower temperature and pressure steam to the vapor flow channels 124, 128, 132 and 136 on the opposite side of the MD membranes 104, 106, 108.

During desalination, the vapor compressor 18 compresses steam 60 from a low temperature side 50 of the MD module 12. The hot steam 62 is introduced to a high temperature side 52 of the MD module 12. In this way, there is a temperature gradient across of the MD module 12. This temperature gradient causes progressively lower vapor pressures in the vapor flow channels 120, 124, 128, 132, 136 from the hot side 50 to the cold side 52 of the MD module 12. In each repeat pairing 44 a vapor 48 passes through the MD membranes 104, 106, 108 and is condensed forming condensation 46 and collected as product water via output flow stream 24. Depending on the vapor compression ratio and the number of repeat pairings 44 in the MD module 12, different temperature and vapor pressure drops across the MD module 12 can be maintained. In general, and embodiment having more repeat pairings 44, such as the embodiment illustrated in FIG. 2, will have higher the fraction of latent heat of condensation that is transferred directly to evaporation and a higher thermal efficiency than an embodiment having fewer repeat pairings 44, such as that illustrated in FIG. 1.

As previously introduced, a heat exchanger 101 may be included in the desalination system 100 to improve thermal efficiency. Heat exchanger 101 may be formed as a standard counter-flow heat exchanger through which the input feed stream 22 and the output flow stream 24 pass. During the desalination process, the output (product) flow stream 24 that is output from the MD module 12 will have a temperature greater than the ambient conditions and thus greater than the input feed stream 22. The thermal energy of the output flow stream 24 may be transferred to the input feed stream 22 by the heat exchanger 101. The incorporation of the heat exchanger 101 into the system 100 provides for a reduction in the amount of energy that has to be supplied to the vapor compressor 18 to produce steam.

Figure 3:
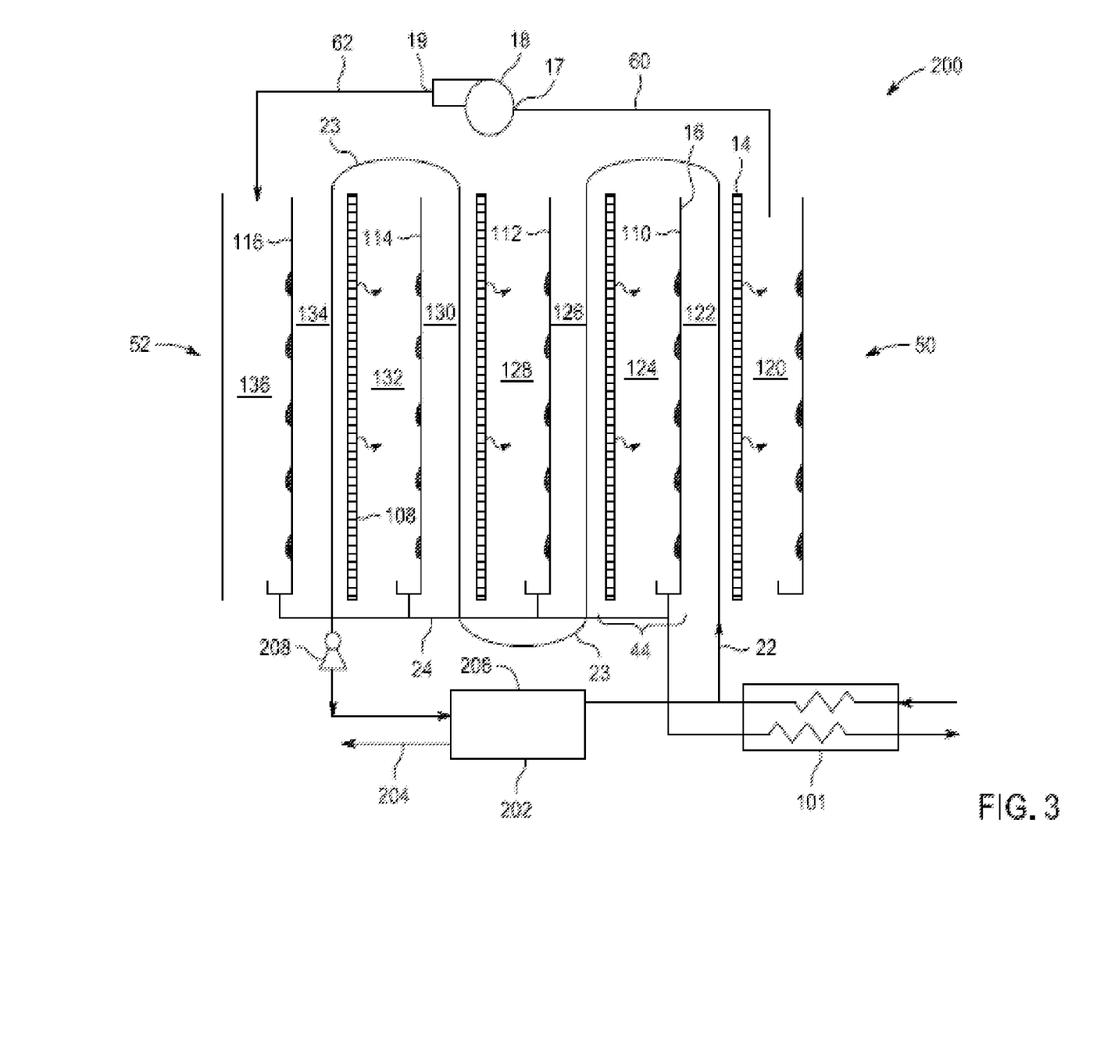
FIG. 3 is a schematic diagram of the desalination system including a crystallizer in accordance with an exemplary embodiment.

Referring now to FIG. 3, illustrated is a schematic diagram of a desalination system 200 that utilizes vapor compression multi-effect membrane distillation including a MD module 12, a heat exchanger 101 and a means for removing solid precipitates from the liquid flow according to another embodiment. Desalination system 200 is similar to desalination systems 10 and 100 previously described. In the illustrated embodiment, desalination system 200 comprises a membrane distillation (MD) module 12 including a plurality of MD membranes 14 and heat transfer films 16 arranged in alternating or interleaved configuration and of materials similar to the embodiments illustrated in FIGS. 1 and 2. In this particular embodiment, the desalination system 200 further includes a vapor compressor 18, a heat exchanger 101 and a crystallizer 202.

The MD module 12 is configured to receive an input feed stream 22, also referred to as a brine stream, having undesirable species, such as salts or other impurities from a liquid source for desalination. An output flow stream (a product stream) 24 coming out of the MD module may be a dilute liquid having a lower concentration of salts or other impurities as compared to the input feed stream 22.

In the illustrated embodiment, the MD module 12 may comprise MD membranes 102, 104, 106, 108 interleaved with heat transfer films 110, 112, 114, 116 in a manner generally described with regard to FIG. 2 and thus not necessary for further description. In addition, the MD module 12 is configured to include a plurality of liquid flow channels 122, 126, 130 and vapor flow channels 120, 24, 128, 132, 134 therein. An inlet 17 of the vapor compressor 18 is coupled to the first extreme vapor channel 120 and an outlet 19 of the vapor compressor 18 is coupled to the second extreme vapor channel 136. The coupling of the vapor compressor and the channels 120 and 136 provides for the introduction of hot steam to one side of the MD module 12 and cooler steam to be withdrawn from the other side of the MD module 12. During the desalination process, a liquid, such as a flow stream 23 is passed through the MD module 12, and the desalinated product exits the MD module as the output (product) flow stream 24. In the illustrated embodiment, the MD module 12 is constructed so that the flow stream 23 is countercurrent to the direction of vapor and heat transport within the liquid flow channels 122, 126, 130 and vapor flow channels 120, 24, 128, 132, 134.

In the embodiment illustrated in FIG. 3, four repeat MD pairings 44, each comprised of a single MD membrane 14 and a heat transfer film 16 form the MD module 12 and achieve desalination. It should be understood that it is anticipated that any number of MD pairings may be used to form the MD module, and that the embodiment of FIG. 3 is illustrative only and not intended to be limiting.

During desalination, the vapor compressor 18 compresses steam 60 from a low temperature side 50 of the MD module 12. The hot steam 62 is introduced to a high temperature side 52 of the MD module 12 and thereby achieves a temperature gradient across of the MD module 12. In each repeat pairing 44 a vapor 48 passes through the MD membranes 104, 106, 108 and is condensed forming condensation 46 and collected as product water via output flow stream 24.

Similar to the embodiment of FIG. 2, a heat exchanger 101 may be included in the desalination system 200 to improve thermal efficiency. The incorporation of the heat exchanger 101 into the system 200 provides for a reduction in the amount of energy that has to be supplied to the vapor compressor 18 to produce steam.

In some applications it may be desirable to use vapor compression multi-effect membrane distillation to concentrate the input feed stream 22 beyond the saturation limit so that solids will precipitate in the flow stream 23. Operating in this mode is sometimes called zero liquid discharge (ZLD) in which nearly all of the product or water recovered from the flow stream 23 is recycled to the plant, and a sludge or slurry of precipitated solids is removed for disposal as a solid waste. As previously described, in addition to the heat exchanger, or in lieu of the heat exchanger 101, desalination system 200 may include a means for removing these solid precipitates from the liquid flow stream 23. More specifically, and as illustrated in FIG. 3, an embodiment may include the crystallizer 202. To prevent solids from precipitating on the MD membranes 102, 104, 106, 108 and heat transfer foils 110, 112, 114, 116 a crystallization device, in the form of crystallizer 202, can be used. The crystallization device may be used downstream of the MD module 12, although alternate configurations are incorporated herein. The concentrated liquid flow stream 23 from the MD module 12 will flow into the crystallization device, and more particularly the crystallizer 202. This configuration of the crystallization device will allow sufficient residence time and flow conditions to allow particulates to precipitate from the liquid flow stream 23. The precipitates will be separated by gravity and filtration devices configured as a part of the crystallizer 202 and removed as a sludge or slurry 204. The remaining liquid flow stream 23 that exits the crystallizer 202 filtration device will be reduced in dissolved solids and can be returned to an inlet of the MD module 12 as input feed stream 22 for further water recovery.

The heat exchanger 101 and the crystallizer 202 may be readily implemented in the disclose desalination system by one skilled in the art. In one non-limiting example, the crystallizer 202 may be a thermal crystallizer, such as a dryer. In certain applications, the heat exchanger 101 and/or the crystallizer 202 may not be employed.

As depicted in FIG. 3, the crystallizer 202 may comprise a vessel configured to define a containment zone (not labeled) to accommodate the liquid flow stream 23 and a crystallization element defining a crystallization zone (not labeled) disposed in fluid communication with the containment zone. Thus, a part of precipitate particles of the salts or other impurities may be separated by settling into a lower portion of the vessel before the liquid flow stream 23 is circulated into the input of the MD module 12.

Accordingly, as illustrated in FIG. 3, the liquid flow stream 23 is directed into the crystallizer 202 for solid-liquid separation and circulation. With the circulation of the liquid flow stream 23 between the MD module 12 and the crystallizer 202, the precipitation of (formed by) ions occurs and increases in the crystallizer 202 over time. Thus, the precipitate particles with diameters larger than a specified diameter may settle down in the lower portion of the crystallizer vessel 206. Meantime, other precipitate particles with diameters smaller than the specified diameter may be dispersed in the liquid flow stream 23 and return to the MD module 12 in the input feed stream 22 for further desalination processing.

In other examples, a device 208 including a pump may also be provided to facilitate the liquid flow 23 into the crystallizer 202.

Figure 4:
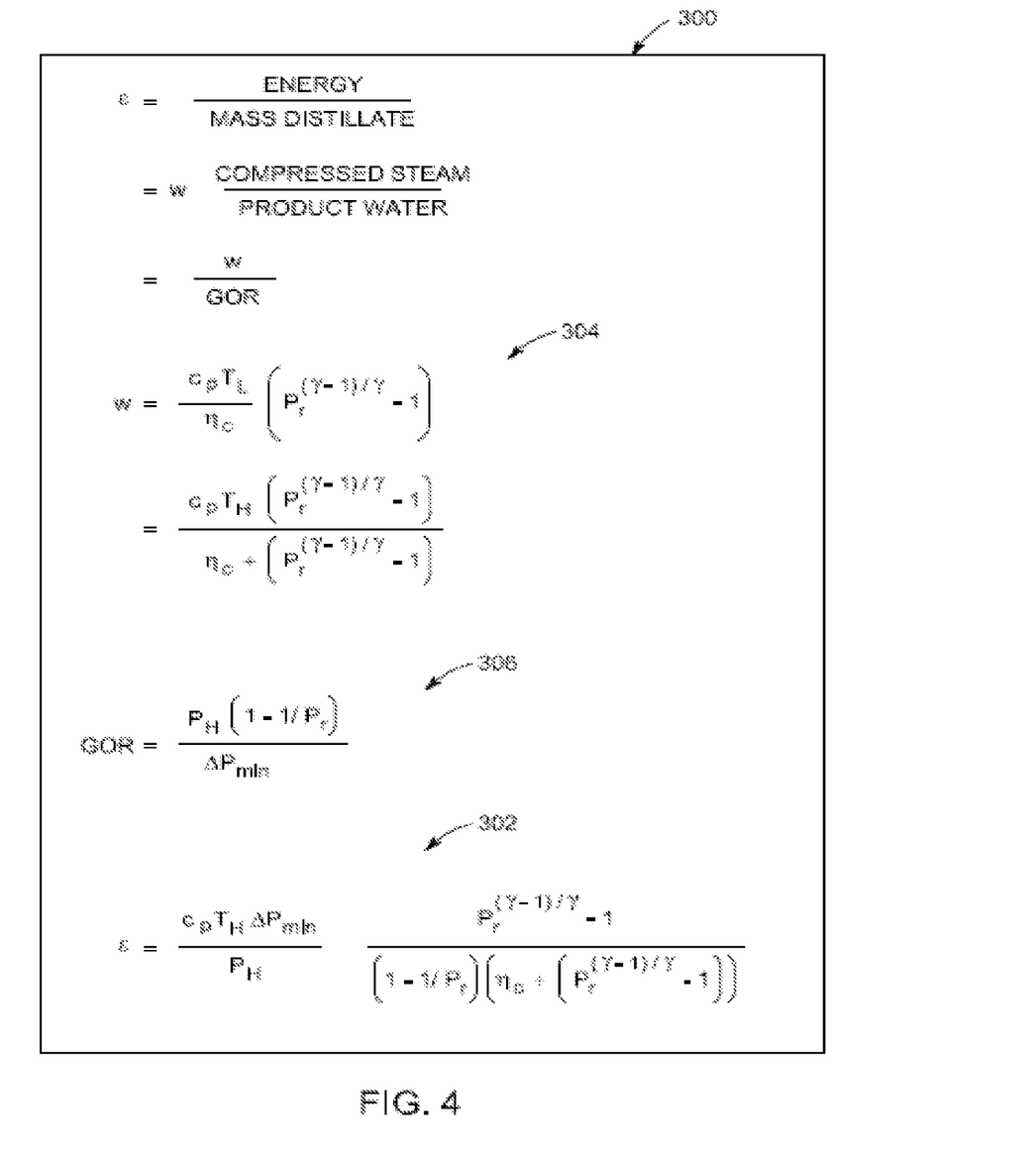
FIG. 4 illustrates a plurality of equations to determine an optimum pressure ratio required to minimize the energy needed to drive the compressor per unit of product water.
Figure 5:
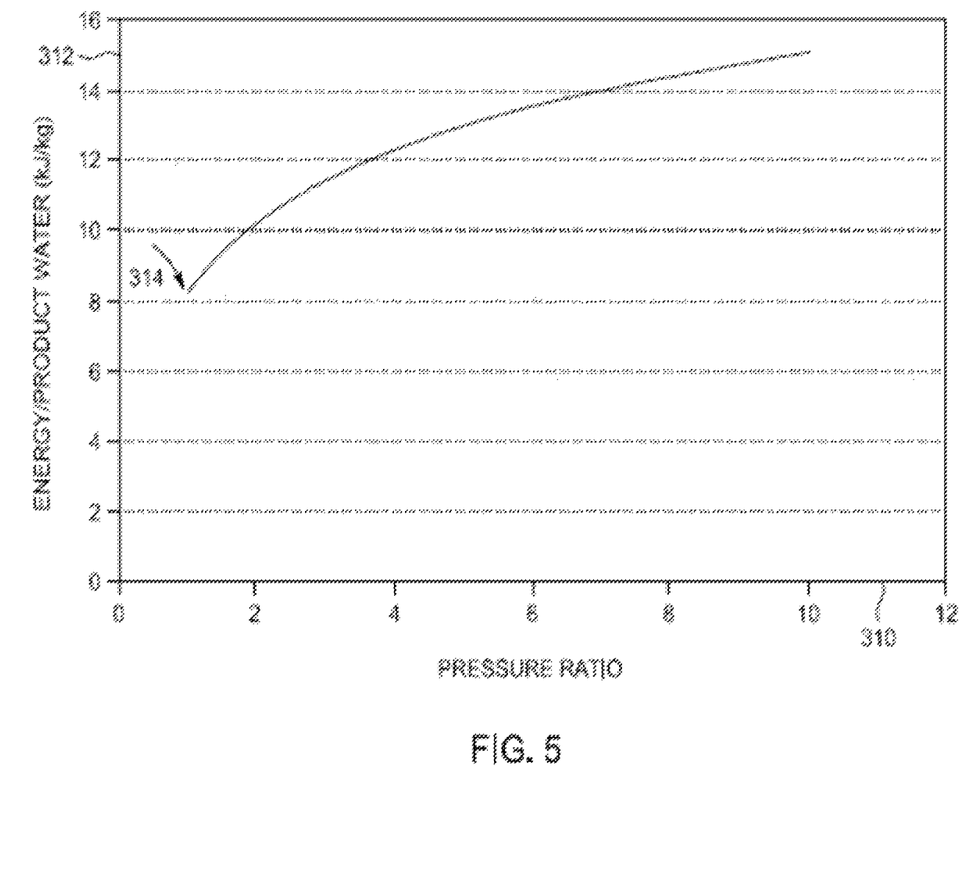
FIG. 5 is a graphical representation of the energy efficiency vs pressure ratio of the desalination system in accordance with an exemplary embodiment.

Referring now to FIGS. 4 and 5, illustrated are a plurality of equations 300 to determine the optimum pressure ratio required to minimize the energy needed to drive the compressor per unit of product water ($\epsilon$) 302 and a graphical representation illustrating the energy efficiency vs pressure ratio. Vapor compressors can be used in various operating conditions. The operating conditions can be defined by the pressure ratio of the outlet to inlet streams of the compressor, the compressor's isentropic efficiency and the inlet or outlet temperature. Referring more specifically to FIG. 4, the plurality of equations 300 shown are used to determine the optimum pressure ratio to minimize the energy to drive the compressor per unit of product water ($\epsilon$) 302. The work supplied to the compressor (w) 304 per unit of compressor vapor is approximated by assuming ideal gas behavior. The gain output ratio (GOR) 306 is the ratio of product water to steam supplied by the compressor. The equations 300 and the graphical representation illustrated in FIG. 5, show that the supplied energy ($\epsilon$) 302 is minimized for small pressure ratios. In the limit as the pressure ratio 310 approaches 1, the driving force for flow across the membrane 312 approaches zero at point 314. Therefore at the most efficient operating point for the compressor the size of the MD module would be large to achieve a required production rate. The optimum design in terms of capital expense and energy costs will be a tradeoff between these factors.

Accordingly, disclosed is a water desalination system that utilizes vapor compression multi-effect membrane distillation that requires low energy input and low capital costs. The concept of recovering latent heat when using water vapor as a heat source in successively lower temperature stages is used in conventional thermal desalination processes like multi-stage flash and multi-effect distillation. These conventional technologies are constructed of expensive metals and are extremely large because they operate under vacuum conditions and require pressure vessels to contain low-density water vapor. In vacuum multi-effect MD (VMEMD), these size and material costs may be reduced, but VMEMD requires a source of steam and a significant source of cooling. Integrating with an industrial source of steam can be expensive and inconvenient as the steam ductwork is large and the condensate needs to be returned to the plant. In addition, the cooling water requirements can be more than five times the product flow rate. This means for systems cooled by the feed water (typical for desalination) the intake system (piping, pumps, strainers, filters) for the feed water (seawater) need to be sized accordingly. These requirements greatly limit the applications for VMEMD. In addition, to achieve high thermal efficiency the VMEMD configuration requires as large of temperature difference as possible across the VMEMD assembly. This requirement leads to very low pressures (<0.1 bar) at the cold side of the MD train of modules. The low pressures will limit the flux of vapor through the colder membranes and thereby increase the capital cost of the system.

The desalination system disclosed herein has an advantage over conventional MD membrane distillation technologies, including VMEMD, in that the vapor compressor provides the source of higher temperature steam and the cooling required by the low-pressure side of the MD train, or repeat, of modules. External sources of heat and cooling are not required. Therefore the size of the intake system can be much smaller than for VMEMD and a source of steam is not necessary. In addition, by operation at moderate pressure ratios such as between 1.2-1.5 bar, and compressor output temperatures such as between 80° C.-120° C., the entire MD train can operate at vapor pressures above approximately 0.3 bar and achieve relatively high fluxes. In addition, by combining multiple effects, enabled by the low cost of construction of the MD modules, with vapor compression, significantly lower energy requirements can be achieved than for conventional mechanical vapor compression systems. Due to the high cost of construction, conventional mechanical vapor compression systems are limited in practice to one or two effects.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A desalination system comprising:
a membrane distillation module configured to receive an input feed stream for desalination and produce an output flow stream of a product; and
a vapor compressor in fluidic communication with the membrane distillation module and configured to introduce a hot steam to a high temperature side of the membrane distillation module and extract a cool steam, having a temperature less than the hot steam, from a low temperature side of the membrane distillation module, thereby creating a temperature gradient across of the MD module,
wherein a latent heat of condensation produced by the temperature gradient across the MD module is transferred directly to a latent heat of vaporization, via a means for exchanging heat, during desalination of a liquid flow stream between the input feed stream and the output flow stream.

2. The desalination system of claim 1, further comprising a heat exchanger in fluidic communication with the input feed stream and the output flow stream and configured to transfer thermal energy from the output flow stream to the input feed stream.

3. The desalination system of claim 1, further comprising a crystallizer in fluidic communication with the liquid flow stream and configured to carry away precipitates from the liquid flow stream.

4. The desalination system of claim 1, further comprising a heat exchanger in fluidic communication with the input feed stream and the output flow stream and configured to transfer thermal energy from the output flow stream to the input feed stream and a crystallizer in fluidic communication with the liquid flow stream and configured to carry away precipitates from the liquid flow stream.

5. The desalination system of claim 1, wherein the membrane distillation module further comprises a plurality of repeat pairings each comprised of a membrane distillation membrane and a heat transfer film.

6. The desalination system of claim 1, wherein the membrane distillation module further comprises a plurality of membrane distillation membranes interleaved with a plurality of heat transfer films, the plurality of membrane distillation membranes and the plurality of heat transfer films configured spaced apart to define a plurality of channels therebetween.

7. The desalination system of claim 6, further comprising a plurality of liquid flow channels each bounded by a membrane distillation membrane and a heat transfer film.

8. The desalination system of claim 7, further comprising a first extreme vapor flow channel formed between and bounded by a membrane distillation membrane and a surface of an object comprising one of a plate and frame assembly or a tank into which the membrane distillation module is disposed and a second extreme vapor flow channel formed between and bounded by a heat transfer film and a surface of the object into which the membrane distillation module is disposed.

9. The desalination system of claim 6, wherein the plurality of membrane distillation membranes are formed of at least one porous hydrophobic polymer film.

10. The desalination system of claim 6, wherein the plurality of heat transfer films are formed of one of a metal foil or a polymer film.

11. The desalination system of claim 1, wherein the vapor compressor further comprise an inlet coupled to a vapor channel bounded by a membrane distillation membrane and a surface of an object comprising one of a plate and frame assembly or a tank into which the membrane distillation module is disposed and an outlet coupled to a vapor channel bounded by a heat transfer film and a surface of the object into which the membrane distillation module is disposed.

12. A desalination method comprising:
supplying an unpurified liquid in an input feed stream;
providing a membrane distillation module configured to receive the input feed stream for desalination and produce an output flow stream of an at least partially purified liquid;
supplying a vapor compressor in fluidic communication with the membrane distillation module;
passing the input feed stream through the membrane distillation module as a flow stream while withdrawing a steam from a low temperature side of the membrane distillation module, compressing the withdrawn steam to produce a hot steam having a higher temperature than the withdrawn steam and introducing the hot steam to a high temperature side of the membrane distillation module, thereby creating a temperature gradient across of the MD module, and
wherein a latent heat of condensation produced by the temperature gradient across the MD module is transferred directly to a latent heat of vaporization, via a means for exchanging heat, during the desalination process of a liquid flow stream between the input feed stream and the output flow stream.

13. The desalination method of claim 12, wherein the membrane distillation module further comprises a plurality of membrane distillation membranes and a plurality of heat transfer films, the plurality of membrane distillation membranes and the plurality of heat transfer films configured in an interleaved, spaced apart relationship to form a plurality of liquid flow channels and a plurality of vapor flow channels passing therethrough the membrane distillation module.

14. The desalination method of claim 13, wherein the liquid flow stream between the input feed stream and the output flow stream flows countercurrent to the direction of vapor and heat transport within the channels.

15. The desalination method of claim 13, wherein the liquid flow stream between the input feed stream and the output flow stream flows in parallel within the channels.

16. The desalination method of claim 13, further comprising a plurality of liquid flow channels each bounded by a membrane distillation membrane and a heat transfer film.

17. The desalination system of claim 16, further comprising a first extreme vapor flow channel formed between and bounded by a membrane distillation membrane and a surface of an object comprising one of a plate and frame assembly or a tank into which the membrane distillation module is disposed and a second extreme vapor flow channel formed between and bounded by a heat transfer film and a surface of the object into which the membrane distillation module is disposed.

18. The desalination system of claim 17, wherein the vapor compressor further comprise an inlet coupled to the first extreme vapor channel and an outlet coupled to the second extreme vapor channel.

19. The desalination system of claim 13, wherein the plurality of membrane distillation membranes are formed of at least one porous hydrophobic polymer film.

20. The desalination system of claim 13, wherein the plurality of heat transfer films are formed of one of a metal foil or a polymer film.

* * * * *